United States Patent
Patton

(10) Patent No.: US 7,265,855 B2
(45) Date of Patent: Sep. 4, 2007

(54) PRIORITY INTERRUPTIBLE PRINTING SYSTEM

(75) Inventor: Ronnie N. Patton, Lake Oswego, OR (US)

(73) Assignee: Sharp Laboratories of America, Inc., Camas, WA (US)

(*) Notice: Subject to any disclaimer, the term of this patent is extended or adjusted under 35 U.S.C. 154(b) by 1045 days.

(21) Appl. No.: 09/796,815

(22) Filed: Feb. 28, 2001

(65) Prior Publication Data

US 2002/0118387 A1    Aug. 29, 2002

(51) Int. Cl.
  *G06F 15/00* (2006.01)
(52) U.S. Cl. ............... 358/1.15; 358/1.16; 358/437
(58) Field of Classification Search ........... 358/1.15, 358/437, 1.16
  See application file for complete search history.

(56) References Cited

U.S. PATENT DOCUMENTS

| | | | |
|---|---|---|---|
| 4,466,065 A | 8/1984 | Advani et al. | |
| 4,891,769 A | 1/1990 | Tasaki | |
| 4,947,345 A | 8/1990 | Paradise et al. | |
| 5,206,735 A | 4/1993 | Gauronski et al. | |
| 5,327,526 A | 7/1994 | Nomura et al. | |
| 5,511,150 A * | 4/1996 | Beaudet et al. | 358/1.14 |
| 5,535,009 A | 7/1996 | Hansen | |
| 5,602,974 A | 2/1997 | Shaw et al. | |
| 5,774,356 A | 6/1998 | Hisatake et al. | |
| 5,832,301 A * | 11/1998 | Yamaguchi | 710/48 |
| 5,845,058 A | 12/1998 | Shaw et al. | |
| 5,847,857 A | 12/1998 | Yajima et al. | |
| 5,848,226 A | 12/1998 | Chen et al. | |
| 5,873,659 A | 2/1999 | Edwards et al. | |
| 5,881,213 A | 3/1999 | Shaw et al. | |
| 5,940,582 A | 8/1999 | Akabori et al. | |
| 5,960,168 A | 9/1999 | Shaw et al. | |
| 5,970,223 A | 10/1999 | Debes et al. | |
| 5,970,224 A | 10/1999 | Salgado | |
| 5,993,088 A | 11/1999 | Nogay et al. | |
| 6,130,757 A * | 10/2000 | Yoshida et al. | 358/1.15 |
| 6,469,795 B2 * | 10/2002 | Beaudet et al. | 358/1.14 |
| 6,474,881 B1 * | 11/2002 | Wanda | 400/61 |
| 6,618,167 B1 * | 9/2003 | Shah | 358/1.15 |
| 6,624,908 B1 * | 9/2003 | Petchenkine et al. | 358/1.15 |
| 6,678,068 B1 * | 1/2004 | Richter et al. | 358/1.15 |
| 6,785,013 B1 * | 8/2004 | Ota et al. | 358/1.15 |
| 6,906,813 B1 * | 6/2005 | Tuchitoi et al. | 358/1.14 |

FOREIGN PATENT DOCUMENTS

| | | |
|---|---|---|
| JP | 08305511 | 3/1994 |
| JP | 08235167 | 4/1995 |

* cited by examiner

*Primary Examiner*—Douglas Q. Tran
*Assistant Examiner*—Chan S. Park
(74) *Attorney, Agent, or Firm*—Chernoff, Vilhauer, McClung & Stenzel

(57) ABSTRACT

A printing control system facilitating interruption of a currently printing job so that a higher priority job can be printed is disclosed.

12 Claims, 4 Drawing Sheets

PRIORITY INTERRUPTIBLE PRINTING SYSTEM

CROSS-REFERENCE TO RELATED APPLICATIONS

Not applicable.

BACKGROUND OF THE INVENTION

The present invention relates to a printing control system and, more particularly, to a printing control system facilitating interruption of the printing of a first job to permit a second job having a higher priority to be printed.

Much of the work product of data processing systems is intended for transformation to hard copy via a printer using digital imaging processes. A data processing system may be configured to feature a dedicated printer coupled to an individual personal computer. On the other hand, networked data processing systems have become prevalent in office settings where extensive document processing is performed. Typically, a local area network (LAN) or wider area network includes a plurality of linked workstations, file servers, terminals, scanners, printers, and other data processing devices. LANs provide a means for sharing resources, such as printers, among a number of users, each operating a dedicated workstation. Sharing printers over a network reduces the number of printers required, permits a more sophisticated printer to serve users than would otherwise be economically justified, and reduces the cost of maintaining the printing capability of an operation. A LAN manager is typically responsible for the integration of shared resource in a network and a LAN manager may include a printing control system and a plurality of print drivers utilizing a plurality of different page description languages (PDLs) to facilitate the operation of a plurality of networked printers.

In a typical printing operation with a data processing system, a user at a workstation selects one or more available printing options to be applied to the document and sends the document to a printing control system as a print job described by a Page Description Language (PDL). The printing control system places the jobs in an order and controls the input of data to the printer's engine to ensure that print jobs are correctly printed in a desired sequence. Network printing is further complicated by the fact that a print job can originate from any of the attached workstations at any time. Typically, the print control system accepts a print job from a workstation with options specified by a user, copies the print job and the options over a communications channel, orders the print jobs in a print queue, converts or filters the job to the printer's native language, and, following printing, performs clean up functions, such as notifying the user of the completion of the job.

The order in which jobs are printed is determined by prioritizing rules of the printing control system. Typically, print jobs are ordered according to the time that the request for printing is received by the control system (first in—first out or FIFO). However, print jobs may also be ordered according to the time required to print the job, for example, a shorter job might be printed first. The printing controller may also put print jobs requiring binding first or last in the print queue or may queue jobs as a function of the availability of the required print media in the printer.

Printing controllers may also permit a user to arbitrarily change the order of printing jobs in the print queue. A user with an urgent job may be able to move that job to the front of the queue so that the job will be printed immediately following the completion of the job in process. Typically, the user requesting printing can specify a relative printing priority as an option for the printing job or access a printer folder to manually reorder the print queue. The printing control system may also assign a higher priority to print jobs originating at certain networked workstations.

While printing controllers provide a number options for ordering and reordering print jobs, these options can only be applied at the boundary of a job. In other words, changing the order of jobs in the print queue does not effect a job being printed at the time of the change. For example, if a lengthy report with extensive graphics is currently being printed, the printing cannot be interrupted by an urgent print job and then restarted after the urgent job is completed. To interrupt a currently printing job, the job must be canceled causing the unprinted portion of the job to be removed from the system. After the urgent job has been printed, printing of the canceled job must be manually restarted for all or a user designated portion of the job. This procedure is particularly complicated and inconvenient with a data processing network where each print job may be controlled by a different individual and individual users may be widely separated.

What is desired, therefore, is a printing control system that permits a currently printing job to be interrupted for a more urgent job and then restarted.

DETAILED DESCRIPTION OF THE INVENTION

Figure 1:
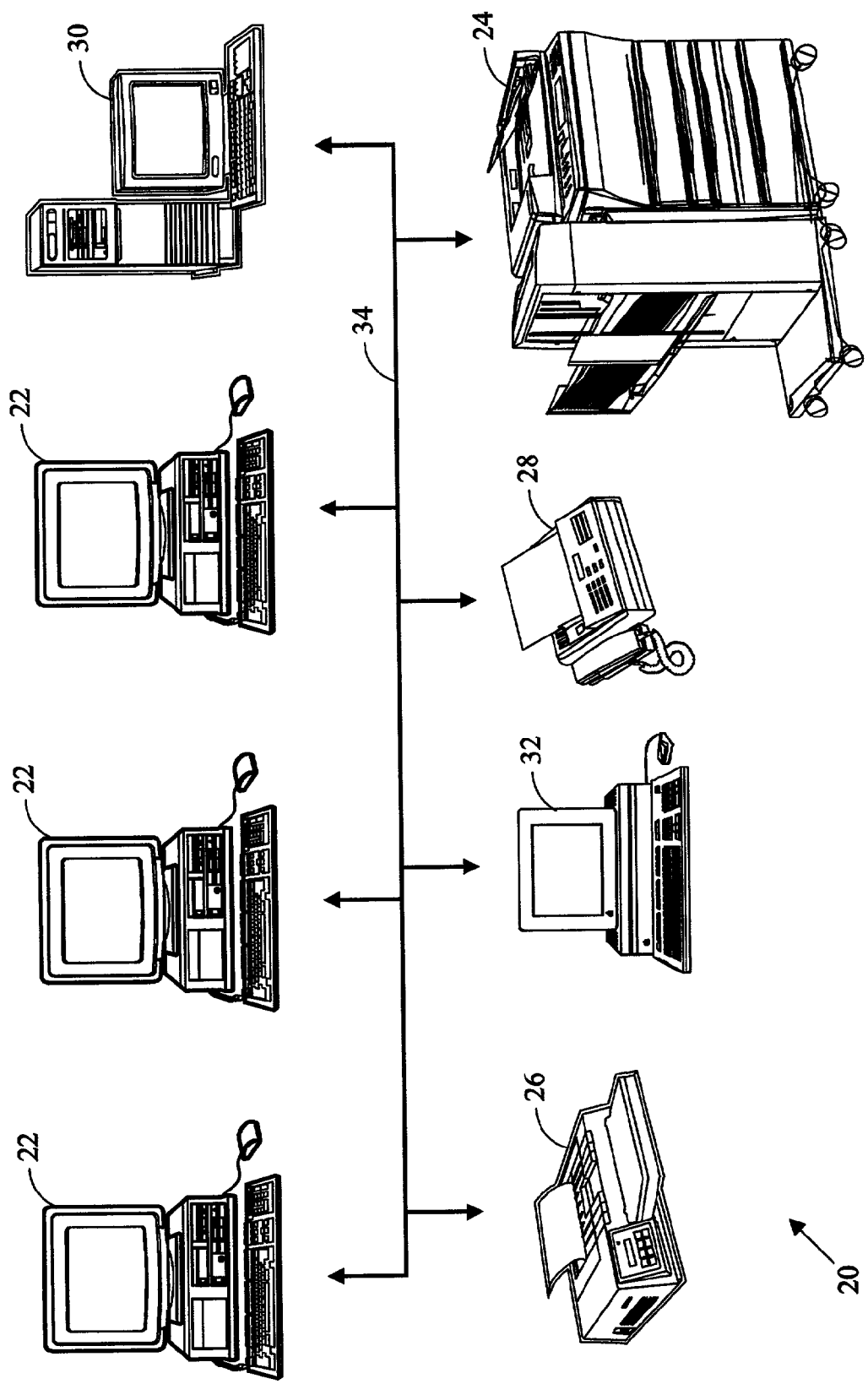
FIG. 1 is a schematic illustration of a data processing network.

Referring to FIG. 1, the printing control system of the present invention may be installed on a single workstation having a dedicated printer but is more typically installed on a data processing network 20 comprising a plurality of workstations 22 and shared resources. The shared resources may include one more printers 24, copiers 26, fax machines 28, scanners (not illustrated), file servers 30 and print servers 32. Printers, copiers, fax machines, and scanners may be standalone devices or may be integrated into one or more multifunction peripheral (MFP) devices. Likewise, file servers 30 and print servers 32 may be standalone devices or may be incorporated in one or more of the workstations 22. The network 20 includes communication links 34 that permit a workstation 22 to transfer files to and from another workstation or to request the services of one of the shared resources. Sharing a resource, such as a printer, eliminates duplication of that resource, reduces the cost of acquiring and maintaining the resource, and permits the operation to use a more sophisticated resource, such as a high speed printer or a color laser printer, than might otherwise be justifiable. However, sharing a resource, such as a printer, requires a sophisticated control for the resource since users may request the services of the resource at random times and any number of users may request services contemporaneously. For example, one user may start printing several sets of a large report with extensive graphics content and moments later a second user may request printing of a high priority agenda for a meeting that is to start immediately while a third user requests printing of a flyer for the company picnic next month. Therefore, it is highly desirable that a control system for a shared resource be able to order and conveniently reorder the activities of the resource.

Figure 2:
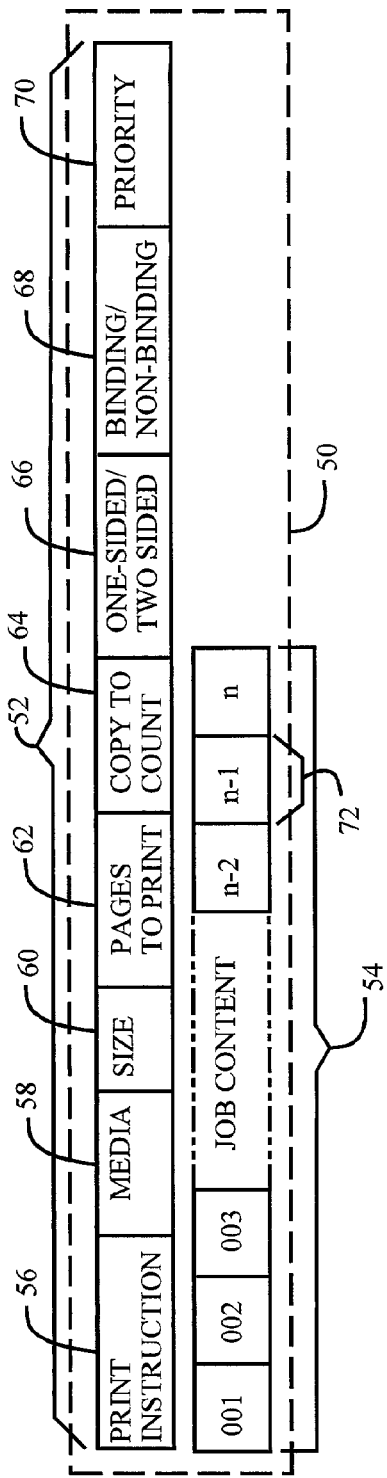
FIG. 2 is a schematic representation of the contents of an exemplary print job.

When a user at a workstation 22 requests printing of a document created with an application program, a user interface is displayed typically permitting the user to select a number of printing options. When the user has selected the desired options, the document is typically converted by a page description language (PDL) to a "print job" and then transferred to a print server 32. FIG. 2 is a schematic representation of the digital data comprising a print job 50. The print job 50 comprises generally a control data portion or job description 52 (indicated by a bracket) and job content portion 54 (indicated by a bracket). The job description often includes a print instruction 56, a media type designation 58, a print medium size 60, a number of pages to print 62, a number of sets of copies to print 64, a one-sided or two-sided printing selection 66, a selection between binding and non-binding 68, and a printing priority value 70. The job description may also contain other control data useful for executing available printing options. The job content 54 is typically the actual document to be printed in digital form. When the print job 50 is transferred to the print server 32, it is described by a page description language (PDL), such as Interpress, Postscript, or Hewlett-Packard PCL (Printer Control Language). The PDL is a language describing the layout and contents of a printed page usually in terms of geometric objects such as lines, arcs, and circles. Exemplary page description languages segment the stream of data comprising the job content 54 into data describing the individual pages 72 (indicated by a bracket) of the document to be printed.

Figure 3:
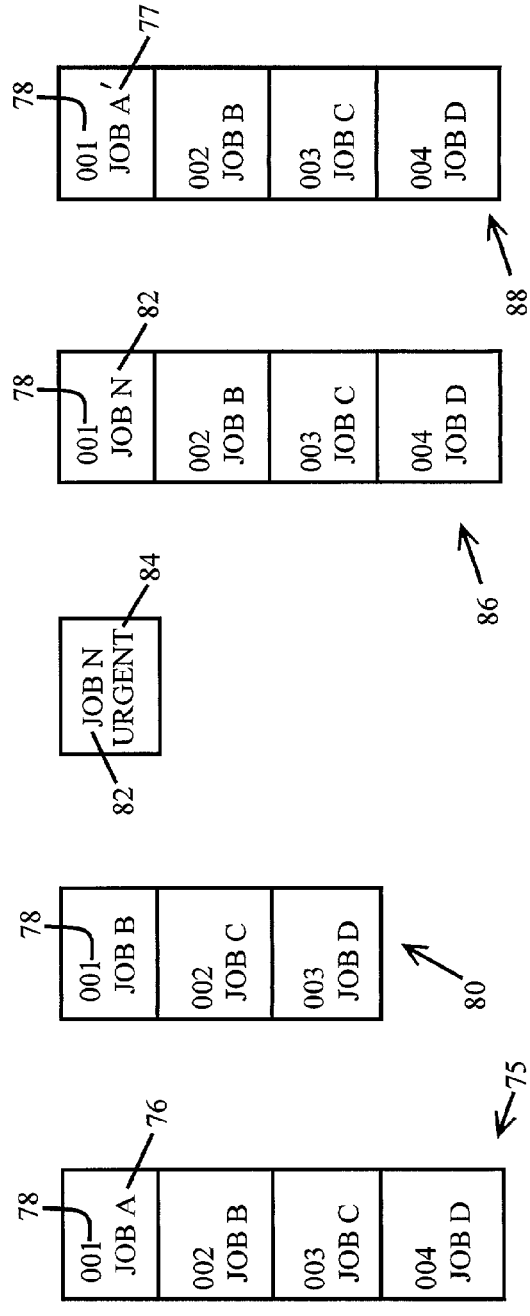
FIG. 3 is a schematic illustration of a print queue table

A printing control system prioritizes print jobs in accordance with a set of prioritizing rules and spools the print jobs in a print queue in the order of intended printing. FIG. 3 is a schematic illustration of a print queue table illustrating an exemplary queuing of print jobs over time. Each job is represented by a job identifier (for example, Job A) and occupies a position (labeled 001-0004) indicating the job's position in the queue. For example, the initial print queue table 75 includes four jobs, identified as Jobs A, B, C, and D that occupy positions (0001-0004) in the queue. When a job (for example, Job A 76) reaches the front of the queue (position 0001) 78, it is sent to a raster image processor. The raster image processor (RIP) "rips" the print job converting the PDL vector image print job to a bit-mapped image suitable for output by the engine of the selected printer. When a job is transferred to the raster image processor, its identifier is deleted from the queue and the remaining jobs are advanced in position toward the front of the queue as illustrated in the updated second version of the queue table 80.

Initially, at least, most printer control systems order print jobs on a first in-first out (FIFO) basis. The job at the front of the queue is next in line for printing and when a new job is received it is inserted at the back of the queue. However, printing control systems also typically permit the print queue to be reordered by a number of means. It may be possible to display the print queue on a user interface and manually move a print job to a higher position in the queue. On the other hand, the printing control system may permit the user to assign a relative priority rank to the print job when requesting printing. The printing control system can then place jobs having a lower priority after jobs having a higher priority. In addition, the control system may order jobs according to the availability of the required printing medium in the printer or the time required to print the job.

While printing control systems typically permit the print queues to be reordered, the reordering is permitted only at the job boundary. Once a print job is transferred to the raster image processor to initiate the physical processes of printing, the print job is no longer available in the print queue and its printing cannot be interrupted to make the printer available for a new higher priority job. A user must manually cancel the currently printing job to make the printer available to print the higher priority job. This causes the unprinted portion of the job to be discarded so that printing of the higher priority job can be started. When the higher priority job is finished, printing of the first job must be manually restarted. Usually it is not necessary to reprint the entire job if the number of pages remaining at the time of cancellation is known. This procedure is inconvenient and, often, impractical with a network shared printer. The currently printing job may be only cancelable by the user that initiated printing and the individual network users may have difficulty communicating their intentions and the appropriate procedures to other members of the work group.

Figure 4:
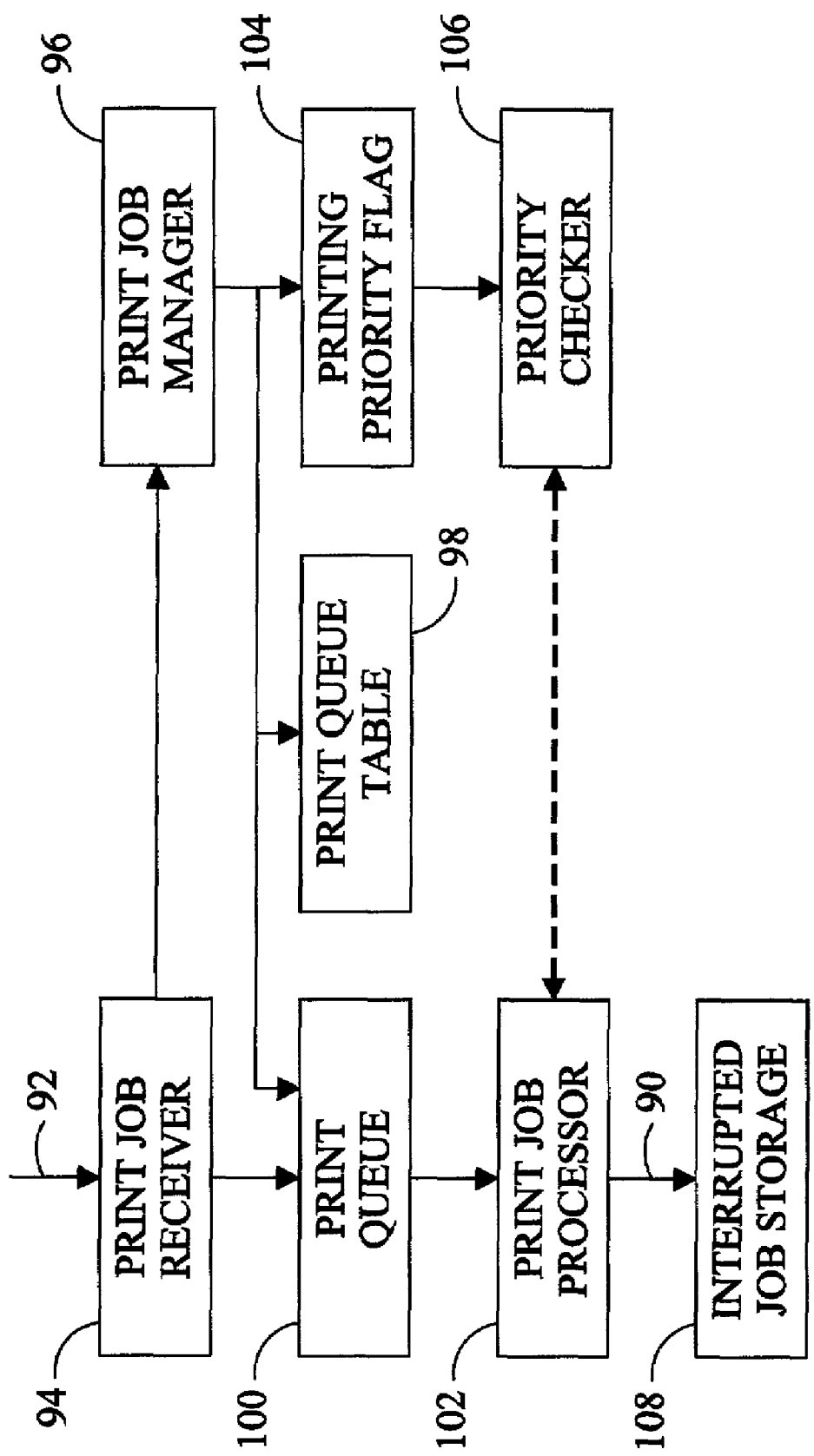
FIG. 4 is a block diagram of the printing control system of the present invention.
Figure 5:
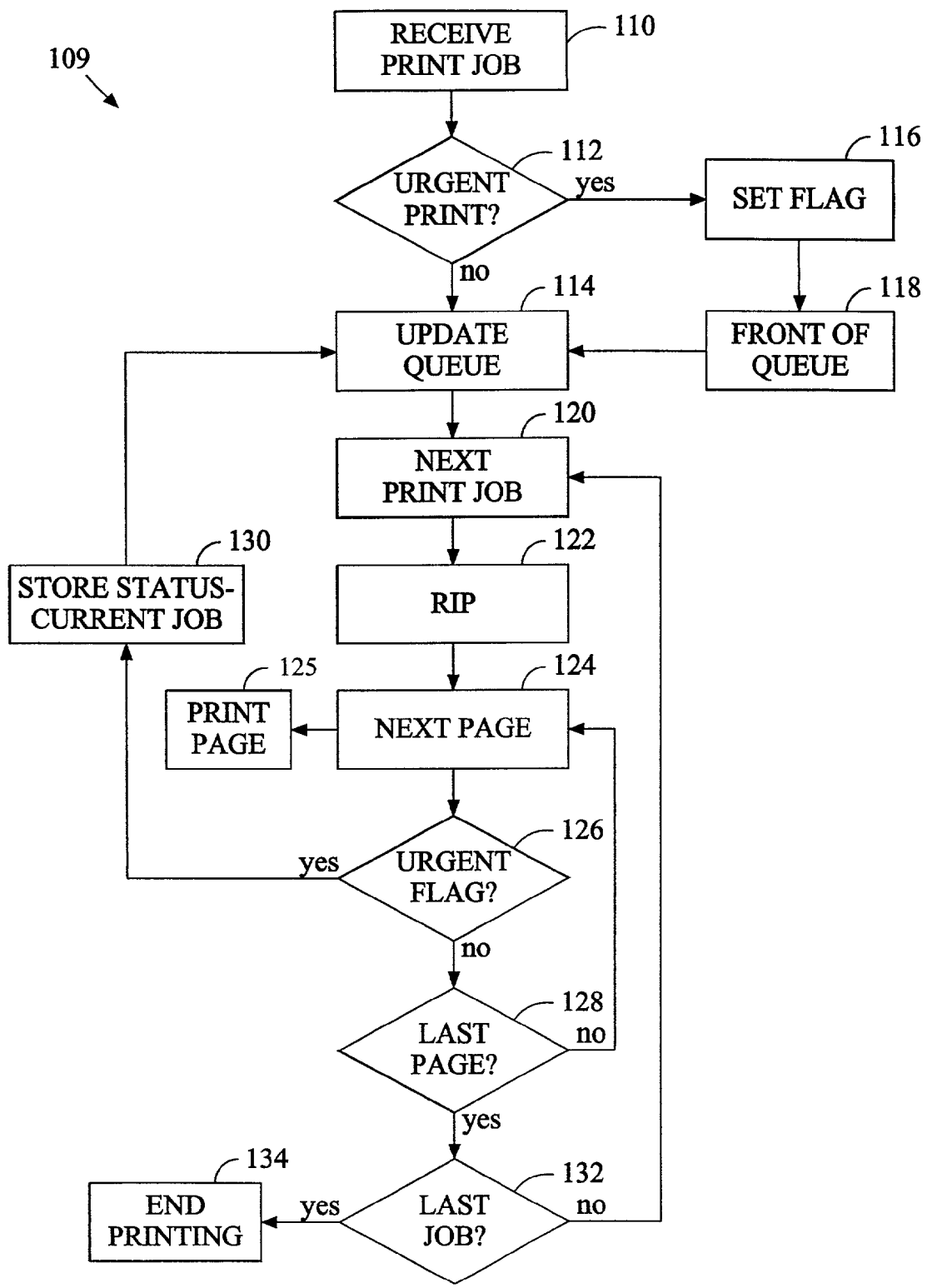
FIG. 5 is a flow diagram of the printing control method of the present invention.

Referring to FIG. 4, a printing job 92 produced at a connected workstation is transferred to a print job receiver 94 of the printing control system 90 of the present invention. When the print job is received, a print job manager 96 prioritizes the job in accordance with its prioritizing rules and creates a job identifier for the job in an appropriate position in a print queue table 98. The print queue table 98 identifies the print jobs currently awaiting printing and the order in which those jobs will be printed. The job identifier in the print queue table 98 locates the data comprising the print job so that the data can be passed in the correct order from the print queue 100 to the print job processor 102 which includes the raster image processor. Referring to FIG. 5, when a print job is received from a workstation the print job manager also examines the job description 52 to determine whether urgent printing is required 112. If urgent printing is not specified, the print job manager 96 prioritizes the job according to its prioritizing rules and updates the print queue table 114 by inserting an identifier for the job in the appropriate position in the table 98. If urgent printing 112 is designated in the job description 52, a printing priority flag 104 is set 116 and the urgent job is inserted at the front of the print queue table 118 when the table is updated 114. Referring again to FIG. 3, when Job N 82 is received by the printing control system its urgent status 84 is noted and the printing priority flag is set. The printing control system 90 updates the print queue table by inserting Job N 82 at the front of the updated queue table 86 in position for printing when the printer is available 120.

However, Job A has already reached the front of the queue 78 and has been sent to the raster image processor 122 of the print job processor 102 for conversion into the bit map used to control the print engine. The output of the raster image processor is loaded into a frame buffer (not illustrated) and the pages of the bit-mapped image data are read sequentially from the frame buffer 124 and printed by the print engine 125. In the printer control method 109 of the present invention, the status of the printing priority flag 104 is checked by a priority checker 106 as the end of each page of job content data is read out 124. If the urgent printing flag is not set 126, the printing control system determines if the last page has been printed 128. If not, the next page of raster image data is obtained from the frame buffer 124 and printed 125.

If the priority checker 106 determines that the printing priority flag 104 is set 126, the printing control system 90 stores the status of the currently printing job (Job A) 130 in the interrupted job storage 108 and the next job (Job N) 120 is transferred to the raster image processor 122 for processing and printing 125. Typically, the job description of the interrupted job including the number of pages and sets remaining to be printed is stored 130. However, if the print server has sufficient memory, the remaining output of the raster image processor may be stored to avoid the need to reprocess the job. A job identifier is created for the job and the printing queue is updated 114. As illustrated in FIG. 3, the remainder of Job A (Job A' 77) is inserted at the front of the updated queue 88. However, the remainder of the Job A (Job A' 77) could be inserted at the end of the queue or the job could be treated as a new print job and the printing control system's prioritizing rules could be applied to establish an appropriate position for the job in the queue.

When the last page of the urgent job is detected 128, the system checks the status of the print queue 132 and begins processing the next job in the queue 120. From the stored job status 130 the unprinted portion of the interrupted print job (Job A' 77) is transferred to the raster image processor 122 or retrieved from storage into the frame buffer and printed 125. Upon completion of the last page of the job, the status of the print queue is checked and if no more jobs remain to be printed, the printing activity is terminated 134.

The printing control system of the present invention makes interruption of a large, low priority printing job for a higher priority job convenient and practical. The ability to interrupt printing of a document to permit printing of a higher priority document is particularly useful for data processing networks where printing resources are shared by a number of users.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

The invention claimed is:

1. A printing method for a data processing system comprising the steps of:
   (a) receiving and storing a first job to be printed at a print server and processing at least one page of said first job into printable page data, providing at least one page of said first job to a printer for printing; receiving and storing a second job to be printed at said print server;
   (b) storing a printing status of said first job in response to a printing priority of said second job and storing said printable page data not yet printed by said printer without storing said at least one page of said first job already provided to said printer;
   (c) printing said second job after all of said second print job has been stored at said print server; and
   (d) printing a page of said not yet printed first job after said second job has been printed.

2. The method of claim 1 wherein the step of storing the printing status of said first job in response to the printing priority of said second job comprises the steps of:
   (a) setting a printing priority indicator in response to a user designation of the printing priority for said second job;
   (b) checking a status of said printing priority indicator; and
   (c) in response to said status of said printing priority indicator, storing a datum identifying said first job.

3. The method of claim 2 wherein said printable page data.

4. The method of claim 2 wherein the step of checking said status of said printing priority indicator occurs when said data of said page of said first job has been processed.

5. The method of claim 2 wherein the step of printing said next page of said first job comprises the steps of:
   (a) inserting a first job identifier in a print queue; and
   (b) recalling said stored datum identifying said first job in response to said first job identifier reaching a next job position in said print queue.

6. The method of claim 5 further comprising the step of printing said next page of said first job identified by said stored datum.

7. A printing method for a data processing system comprising the steps of:
   (a) receiving and storing a first job to be printed at a print server and processing at least one page of said first job into printable page data, receiving and storing a second job to be printed at said print server;
   (b) said second job having a user designated printing priority;
   (c) setting a printing priority indicator in response to said designation printing priority for said second job;
   (d) placing said second job in a next job position in a print queue;
   (f) storing a printing status of said first job in response to a status of said printing priority indicator and storing said printable page data not yet printed by a printer without storing all printable page data send to said printer;
   (g) printing said second job after all of said second print job has been stored at said print server; and
   (d) printing a page of said not yet printed first job after said second job has been printed.

8. The method of claim 7 further comprising the step of inserting an identifier of said first job in said print queue in conjunction with said storage of said printing status of said first print job.

9. The method of claim 7 wherein the step of storing a printing status of said first job in response to a status of said printing priority indicator comprises the step of storing a datum identifying said next page of said first job.

10. The method of claim 7 wherein said printable page data is rasterized image data wherein the step of storing a printing status of said first job in response to a status of said printing priority indicator comprises the step of storing data of said next page of said first job.

11. The method of claim 7 wherein the step of storing a printing status of said first job in response to said status of said printing priority indicator comprises the steps of:
    (a) checking said status of said printing priority indicator when said data of said page of said first job has been processed; and
    (b) storing at least an identifier of said first job in response to said set priority indicator.

12. The method of claim 11 further comprising the step of storing a datum identifying the unprinted portion of said first job.

\* \* \* \* \*

UNITED STATES PATENT AND TRADEMARK OFFICE
CERTIFICATE OF CORRECTION

PATENT NO. : 7,265,855 B2
APPLICATION NO. : 09/796815
DATED : September 4, 2007
INVENTOR(S) : Ronnie N. Patton It is certified that error appears in the above-identified patent and that said Letters Patent is hereby corrected as shown below:

Col. 5, line 54, (Claim 1.(b))
Change "data not yet stored by said printer" to --data not yet stored by a printer--.

Col. 6, line 3, (Claim 3.)
Change "said printable page data." to --said printable page data is rasterized image data.--.

Signed and Sealed this

Twenty-ninth Day of December, 2009

David J. Kappos
*Director of the United States Patent and Trademark Office*